(12) United States Patent
Emge et al.

(10) Patent No.: US 9,403,963 B2
(45) Date of Patent: *Aug. 2, 2016

(54) PARTICLE-COMPRISING POLYETHER ALCOHOLS

(75) Inventors: Andreas Emge, Shanghai (CN); Daniel Freidank, Lemförde (DE); Dejan Petrovic, Ludwigshafen (DE); Marta Reinoso Garcia, Dossenheim (DE); Stefan Winnig, Ramsen (DE); Markus Schütte, Osnabrück (DE)

(73) Assignee: BASF SE, Ludwigshafen (DE)

( * ) Notice: Subject to any disclaimer, the term of this patent is extended or adjusted under 35 U.S.C. 154(b) by 433 days.

This patent is subject to a terminal disclaimer.

(21) Appl. No.: 13/590,353

(22) Filed: Aug. 21, 2012

(65) Prior Publication Data

US 2013/0217796 A1    Aug. 22, 2013

Related U.S. Application Data

(60) Provisional application No. 61/526,303, filed on Aug. 23, 2011.

(51) Int. Cl.
| | |
|---|---|
| *C08K 5/06* | (2006.01) |
| *C08K 5/053* | (2006.01) |
| *C08F 290/14* | (2006.01) |
| *C08G 18/48* | (2006.01) |
| *C08G 18/50* | (2006.01) |
| *C08G 18/61* | (2006.01) |
| *C08G 18/63* | (2006.01) |
| *C08G 77/46* | (2006.01) |
| *C08F 283/00* | (2006.01) |
| *C08F 283/06* | (2006.01) |
| *C08F 283/12* | (2006.01) |
| *C08F 290/06* | (2006.01) |
| *C08J 9/00* | (2006.01) |
| *C08G 18/71* | (2006.01) |
| *C08G 18/40* | (2006.01) |
| *C08G 65/336* | (2006.01) |
| *C08G 101/00* | (2006.01) |

(52) U.S. Cl.
CPC ............. *C08K 5/06* (2013.01); *C08F 283/004* (2013.01); *C08F 283/065* (2013.01); *C08F 283/12* (2013.01); *C08F 290/062* (2013.01); *C08F 290/068* (2013.01); *C08F 290/142* (2013.01); *C08F 290/148* (2013.01); *C08G 18/4072* (2013.01); *C08G 18/482* (2013.01); *C08G 18/5021* (2013.01); *C08G 18/61* (2013.01); *C08G 18/632* (2013.01); *C08G 18/635* (2013.01); *C08G 18/636* (2013.01); *C08G 18/71* (2013.01); *C08G 65/336* (2013.01); *C08G 77/46* (2013.01); *C08J 9/0023* (2013.01); *C08J 9/0028* (2013.01); *C08K 5/053* (2013.01); *C08G 2101/005* (2013.01); *C08G 2101/0025* (2013.01)

(58) Field of Classification Search
CPC ............. C08F 283/004; C08F 283/065; C08F 283/184; C08F 290/062; C08F 290/068; C08F 290/142; C08F 290/148; C08F 283/12; C08K 5/06; C08K 5/053; C08G 77/46; C08G 18/4072; C08G 18/482; C08G 18/5021; C08G 18/61; C08G 18/632; C08G 18/635
See application file for complete search history.

(56) References Cited

U.S. PATENT DOCUMENTS

| | | | | |
|---|---|---|---|---|
| 4,043,951 | A | * | 8/1977 | Prokai et al. ................ 521/111 |
| 4,058,494 | A | * | 11/1977 | Prokai et al. ................ 521/111 |
| 4,689,354 | A | | 8/1987 | Ramlow et al. |
| 4,723,026 | A | | 2/1988 | Cloetens et al. |
| 4,831,076 | A | | 5/1989 | Lidy et al. |
| 4,883,832 | A | | 11/1989 | Cloetens et al. |
| 5,447,997 | A | | 9/1995 | Raleigh et al. |
| 5,523,375 | A | | 6/1996 | Raleigh et al. |
| 5,990,185 | A | * | 11/1999 | Fogg ................ 521/112 |
| 2011/0263737 | A1 | | 10/2011 | Fricke et al. |
| 2011/0263742 | A1 | | 10/2011 | Zarbakhsh et al. |
| 2012/0232180 | A1 | | 9/2012 | Kunst et al. |

FOREIGN PATENT DOCUMENTS

| | | |
|---|---|---|
| EP | 0 439 755 A2 | 8/1991 |
| EP | 0 510 533 A2 | 10/1992 |
| EP | 1 108 514 A1 | 6/2001 |
| JP | 11-60651 | 3/1999 |
| JP | 2000-169541 | 6/2000 |
| WO | WO 00/59971 | 10/2000 |
| WO | WO 03/078496 A1 | 9/2003 |
| WO | WO 2004/035650 A1 | 4/2004 |
| WO | WO 2005/097863 A1 | 10/2005 |

(Continued)

OTHER PUBLICATIONS

U.S. Appl. No. 13/497,277, filed Mar. 21, 2012, Kunst, et al.
U.S. Appl. No. 13/590,329, filed Aug. 21, 2012, Emge, et al.
U.S. Appl. No. 13/438,069, filed Apr. 3, 2012, Kunst, et al.
U.S. Appl. No. 13/590,345, filed Aug. 21, 2012, Fricke, et al.
U.S. Appl. No. 13/586,598, filed Aug. 15, 2012, Emge, et al.

(Continued)

*Primary Examiner* — Rabon Sergent
(74) *Attorney, Agent, or Firm* — Oblon, McClelland, Maier & Neustadt, L.L.P.

(57) ABSTRACT

The invention relates to particle-comprising polyether alcohols which can be prepared by in-situ polymerization of olefinically unsaturated monomers in a polyether alcohol, wherein the polymerization is carried out in the presence of at least one compound (A) comprising a polysiloxane chain to which at least one polyether chain comprising at least one reactive hydrogen atom and a polyether chain comprising at least one olefinic double bond are bonded.

14 Claims, No Drawings

(56) References Cited

FOREIGN PATENT DOCUMENTS

| WO | WO 2007/101048 A2 | 9/2007 |
|----|---|---|
| WO | WO 2011/039082 A1 | 4/2011 |
| WO | WO 2011/039200 A1 | 4/2011 |
| WO | WO 2011/134856 A1 | 11/2011 |
| WO | WO 2011/134866 A2 | 11/2011 |
| WO | WO 2012/119970 A2 | 9/2012 |
| WO | WO 2012/136608 A1 | 10/2012 |
| WO | WO 2013/024101 A2 | 2/2013 |
| WO | WO 2013/026738 A1 | 2/2013 |
| WO | WO 2013/026809 A1 | 2/2013 |
| WO | WO 2013/026813 A1 | 2/2013 |

OTHER PUBLICATIONS

U.S. Appl. No. 13/590,571, filed Aug. 21, 2012, Emge, et al.
European Search Report issued Jan. 18, 2012, in Patent Application No. 11178520.0 (with English Translation).

* cited by examiner

PARTICLE-COMPRISING POLYETHER ALCOHOLS

CROSS REFERENCE TO RELATED APPLICATION

This application claims the benefit of priority to U.S. provisional application No. 61/526,303, filed on Aug. 23, 2011.

The invention relates to particle-comprising polyether alcohols, their preparation and their use, in particular for the production of polyurethanes, preferably of rigid polyurethane foams.

Particle-comprising polyols have been known for a long time and are widely used for producing polyurethanes. A frequently used variant of particle-comprising polyols is graft polyols. These are usually prepared by in-situ polymerization of olefinically unsaturated monomers in polyols, known as carrier polyols. The polymerization is usually carried out in the presence of compounds which ensure a stable dispersion of the particles in the polyols and are frequently referred to as macromers.

As indicated above, the graft polyols are used for producing polyurethanes. An important field here is the production of rigid polyurethane foams.

These have been known for a long time and are widely described in the literature. They are usually produced by reacting polyisocyanates with compounds having at least two hydrogen atoms which are reactive toward isocyanate groups, in particular polyfunctional alcohols. The rigid polyurethane foams are preferably used for insulation in refrigeration appliances or for construction elements.

Improving the properties of rigid polyurethane foams is an ongoing objective. In particular, the thermal conductivity and the demolding time should be improved and the processibility of the formative components for the rigid polyurethane foams, in particular the compatibility with the blowing agents, should always be ensured.

It has been found that the use of polyether alcohols comprising polymer particles prepared by in-situ polymerization of olefinically unsaturated monomers, in particular styrene and acrylonitrile, enables the ability of the rigid polyurethane foams to be removed from the mold to be improved. Such polyols are frequently also referred to as graft polyols in industry.

Thus, WO 2004/035650 describes a process for producing rigid polyurethane foams using graft polyols. The graft polyols described there are prepared using 2-8-functional polyether alcohols and styrene and acrylonitrile, preferably in a weight ratio of 2:1, and are used in admixture with other polyols, for example polyols based on sugar and on aromatic amines such as toluenediamine for producing the rigid polyurethane foams. The rigid foams described there display good curing and demoldability and good flow behavior. However, disadvantages are the unsatisfactory miscibility of the graft polyols with polyols and the blowing agents and also the poor storage stability of the polyol component, in particular when hydrocarbons are used.

WO 2005/097863 describes a process for producing rigid polyurethane foams using graft polyols which have been prepared using polyether alcohols having a high proportion of ethylene oxide in the chain. This is said to improve the compatibility with the polyols of the formulation.

EP 1108514 describes a process for producing rigid foam panels, in which a graft polyol is used. This is prepared using a polyol mixture comprising a polyether alcohol having an ethylene oxide content of at least 40% by weight. These foams are said to display reduced shrinkage.

JP 2000169541 describes rigid polyurethane foams having improved mechanical strength and a low shrinkage. They are produced using a graft polyol prepared using exclusively acrylonitrile as monomer.

JP 11060651, too, describes a process for producing rigid polyurethane foams using graft polyols prepared using a polyether alcohol having an ethylene oxide content of at least 40% by weight.

However, the use of such large amounts of ethylene oxide in the graft polyols also has disadvantages. Thus, the solubility of the hydrocarbons which are usually used as blowing agent in such polyols is poorer. Furthermore, such polyols have an increased intrinsic reactivity. This reduces the opportunities of controlling the polyurethane formation by means of catalysts.

Particularly when polyols initiated by means of sucrose are used, great miscibility problems with the graft polyols occurs.

It was an object of the present invention to provide polyurethanes, in particular rigid polyurethane foams, which display a high compatibility of the polyol component and use a polyol component having a low viscosity. The resulting rigid foams should display a short demolding time, a low thermal conductivity and good mechanical properties.

The object has surprisingly been able to be solved by a specific particle-comprising polyether alcohol, hereinafter also referred to as graft polyol, and its use for producing polyurethanes, in particular rigid polyurethane foams.

The invention accordingly provides particle-comprising polyether alcohols which can be prepared by in-situ polymerization of olefinically unsaturated monomers in a polyether alcohol, wherein the polymerization is carried out in the presence of at least one compound (A) comprising a polysiloxane chain to which at least one polyether chain comprising at least one reactive hydrogen atom and a polyether chain comprising at least one olefinic double bond are bonded.

The invention further provides a process for preparing particle-comprising polyether alcohols by in-situ polymerization of olefinically unsaturated monomers in a polyether alcohol, wherein the polymerization is carried out in the presence of at least one compound (A) comprising a polysiloxane chain to which at least one polyether chain comprising at least one reactive hydrogen atom and at least one polyether chain comprising at least one olefinic double bond are bonded as side chains.

The invention further provides a process for producing polyurethanes, in particular rigid polyurethane foams, by reacting
a) polyisocyanates with
b) compounds having at least two hydrogen atoms which are reactive toward isocyanate groups,
wherein the component b) comprises at least one particle-comprising polyether alcohol b1) according to the invention.

The particle-comprising polyether alcohols b1) preferably comprise compounds (A) having the general formula (I)

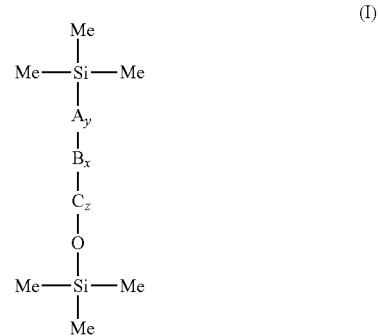

in which

A = 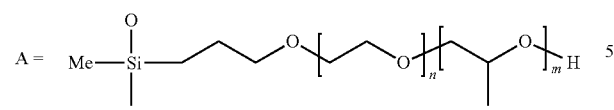

B = 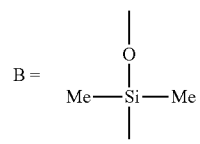

C = 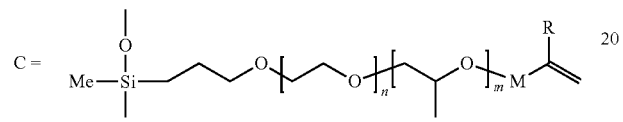

where A, B and C are randomly arranged and x, y and z are selected so that the weight ratio of the polysiloxane chain to the total molecular weight is 0.25 to 0.65,

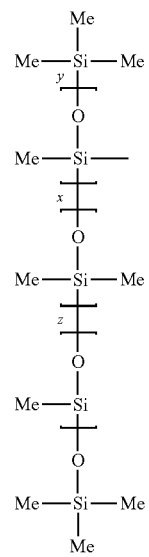

Me is a methyl group,
R is an alkyl group having from 1 to 10 carbon atoms,
M is an alkylene or arylene group or araliphatic group having from 2 to 10 carbon atoms, which can be bonded to the polyether chain via an ether, ester, urethane, carbonate or acetal bond
m, n are integers which are selected so that the molecular weights $M_n$ of the units A and C are in the range from 500 to 2000 and the ratio n:m is in the range from 25:75 to 75:25,
where the polysiloxane chain has a molecular weight $M_n$ in the range from 3000 to 7000.

Preferably, the polysiloxane chain has a molecular weight $M_n$ of from 2000 to 4500.

The particle-comprising polyether alcohols preferably comprise compounds (A) having the general formula (II)

(II)

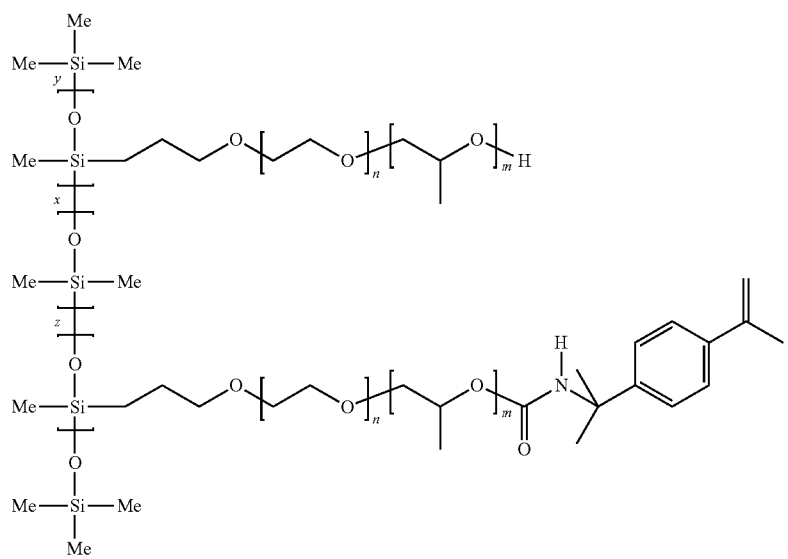

where the variables Me and m, n, x, y and z have the same meanings as in formula (I).

Preferably, the compounds (A) have from 0.7 to 1 group C, in particular 0.85 to 0.95 group C in the molecule.

In general, the compounds (A) have a molecular weight Mn in the range from 8000 to 30 000.

In particular, the compounds (A) have a molecular weight Mn of from 10 000 to 20 000.

In a preferred embodiment, there are on average from 7 to 20 units B between each two units A and/or C.

m and n are preferably selected so that the molecular weights $M_n$ of the units A and C are on average in the range from 700 to 2000.

The graft polyols b1) preferably have a content of polymerized particles, also referred to as solids content, of at least 35% by weight, based on the weight of the graft polyol. The solids content should usually not exceed 65% by weight since otherwise the viscosity of the polyols increases too greatly and problems can thus occur in processing.

The hydroxyl number of the graft polyols b1) of the invention is preferably from 40 to 260, in particular from 40 to 150, mg KOH/g.

The preparation of compounds (A) can, for example, be carried out as follows: in a first step, the polysiloxane backbone is produced by means of an equilibrium reaction of hexamethyldisiloxane (HMDS), octamethyldisiloxane (OMTS) and polymethylhydrosiloxane (PMHS) in the presence of trifluoromethanesulfonic acid. Ring opening of OMTS and depolymerization of PMHS occurs here. HMDS reacts with the oligomers formed and produces the end groups in this case. In a second step, allyl alcohol is alkoxylated by means of ethylene oxide and/or propylene oxide to produce an allyl polyetherol. In a third step, a platinum-catalyzed hydrosilylation of the allyl group of the allyl polyetherol is carried out to form a polyethersiloxane. Here, Si—C bonds are formed by insertion of double bonds of the allyl groups of the allyl polyetherol into Si—H bonds of the polysiloxane. Typically, 1.5 equivalents of allyl polyetherol are used. In a fourth step, the polyethersiloxane is reacted, for example, with dimethylmetaisopropylbenzyl isocyanate (TMI) or a similar compound. Here, radicals having polymerizable double bonds, for example dimethylmetaisopropenylbenzyl radicals, are inserted into the polymer to form urethane groups. This synthesis step can be carried out at 80° C. Preference is given to using a substoichiometric amount of TMI here, so that on average less than one OH group of the polyethersiloxane per molecule reacts with TMI. Selection of the stoichiometric ratios enables the variables x, y, z, n and m to be set in a targeted manner.

The graft polyols b1) of the invention are usually prepared by in-situ polymerization of olefinically unsaturated monomers in polyether alcohols, hereinafter also referred to as carrier polyols, in the presence of at least one compound (A). The compound (A) will hereinafter also be referred to as macromer.

Preferably used olefinically unsaturated monomers are styrene and/or acrylonitrile.

The ratio h of the molecular weight of the hydrophobic constituents of the molecule (polysiloxane chain) of the compound (A) to the total molecular weight is from 0.25 to 0.65.

As carrier polyols, preference is given to using those having a functionality of from 2 to 4, in particular from 3 to 4. They are usually prepared by addition of alkylene oxides, in particular propylene oxide or mixtures of propylene oxide and ethylene oxide comprising not more than 20% by weight, based on the weight of the polyether alcohol b11), of ethylene oxide, onto H-functional starter substances. The starter substances are usually alcohols or amines having the appropriate functionality. Starter substances which are preferably used are ethylene glycol, propylene glycol, glycerol, trimethylolpropane, ethylenediamine and toluenediamine (TDA). In a particularly preferred embodiment of the invention, TDA, preferably the ortho-isomers, is used as starter substance.

The carrier polyols preferably have a hydroxyl number of greater than 100 mg KOH/g, particularly preferably in the range from 100 to 300 mg KOH/g, in particular from 100 to 260 mg KOH/g.

The carrier polyols are prepared by the customary and known processes for preparing polyether alcohols, which are described in more detail below.

The carrier polyols are preferably used singly, but it is also possible to use them in the form of any mixtures with one another.

In the preferred use of TDA, a mixture of ethylene oxide and propylene oxide is preferably used as alkylene oxide, with preference being given to firstly ethylene oxide and then propylene oxide being added on and the addition reaction of the ethylene oxide preferably being carried out in the absence of a catalyst.

During the free-radical polymerization, the compounds A are incorporated into the copolymer chain. This results in formation of block copolymers having a polyether block and a polyacrylonitrile-styrene block which act as phase compatibilizers at the interface of continuous phase and dispersed phase and suppress agglomeration of the graft polyol particles. The proportion of the compound A is usually from 1 to 20% by weight, particularly preferably from 1 to 15% by weight, based on the total weight of the monomers used for preparing the graft polyol.

Moderators, also referred to as chain transfer agents, are usually used for preparing graft polyols. The use and function of these moderators is described, for example, in U.S. Pat. No. 4,689,354. The moderators effect chain transfer of the growing free radical and thus reduce the molecular weight of the copolymers being formed, as a result of which crosslinking between the polymer molecules is reduced, which influences the viscosity and the dispersion stability and also the filterability of the graft polyols. The proportion of moderators is usually from 0.5 to 25% by weight, based on the total weight of the monomers used for preparing the graft polyol. Moderators which are usually used for preparing graft polyols are alcohols such as 1-butanol, 2-butanol, isopropanol, ethanol, methanol, cyclohexane, toluene, mercaptans such as ethanethiol, 1-heptanethiol, 2-octanethiol, 1-dodecanethiol, thiophenol, 2-ethylhexyl thioglycolates, methyl thioglycolates, cyclohexyl mercaptan and also enol ether compounds, morpholines and α-(benzoyloxy)styrene.

The free-radical polymerization is usually initiated using peroxide or azo compounds, e.g. dibenzoyl peroxide, lauroyl peroxide, t-amyl peroxy-2-ethylhexanoate, di-t-butyl peroxide, diisopropyl peroxide carbonate, t-butyl peroxy-2-ethylhexanoate, t-butyl perpivalate, t-butyl perneodecanoate, t-butyl perbenzoate, t-butyl percrotonate, t-butyl perisobutyrate, t-butyl peroxy-1-methylpropanoate, t-butyl peroxy-2-ethylpentanoate, t-butyl peroxyoctanoate and di-t-butyl perphthalate, 2,2'-azobis(2,4-dimethylvalereronitrile), 2,2'-azobisisobutyronitrile (AIBN), dimethyl-2,2'-azobisisobutyrate, 2,2'-azobis(2-methylbutyronitrile (AMBN), 1,1'-azobis(1-cyclohexanecarbonitrile). The proportion of initiators is usually from 0.1 to 6% by weight, based on the total weight of the monomers used for preparing the graft polyol.

The free-radical polymerization for preparing graft polyols is, due to the reaction rate of the monomers and the half-life of the initiators, usually carried out at temperatures of from 70 to 150° C. and a pressure of up to 20 bar. The preferred reaction conditions for preparing graft polyols are temperatures of from 80 to 140° C. at a pressure ranging from atmospheric pressure to 15 bar.

The graft polyols b1) preferably have a particle size of the polymers of from 0.1 µm to 8 µm, preferably from 0.2 µm to 4 µm with a maximum at a particle size of from 0.2 to 3 µm, preferably from 0.2 to 2.0 µm.

In a further preferred embodiment of the graft polyols b1), the particle size distribution is bimodal, i.e. the distribution curve of the particle size has two maxima. Such graft polyols can, for example, be produced by mixing graft polyols having a monomodal particle size distribution and different particle sizes in the appropriate ratio but also by using a polyol which already comprises polymers of olefinically unsaturated monomers as carrier polyol in the initial charge for the reaction. In this embodiment, too, the particle size is in the above-described range.

The graft polyols b1) can be prepared in continuous processes and batch processes. The synthesis of graft polyols by the two methods is known and is described in a number of examples. Thus, the synthesis of graft polyols by the semibatch process is, for example, described in EP 439755. A special form of the semibatch process is the semibatch seed process in which a graft polyol is additionally used as seed in the initial charge for the reaction, for example as described in EP 510533. The synthesis of graft polyols by a continuous process is likewise known and is described, inter alia, in WO 00/59971.

As described above, the graft polyols of the invention are preferably used for producing polyurethanes, in particular rigid polyurethane foams.

The polyurethanes are produced by customary and known methods by reacting polyols b) with isocyanates a), with the polyols b) comprising at least one graft polyol according to the invention, hereinafter referred to as polyol b1).

The graft polyol b1) can in principle be used as only compound b) having at least two hydrogen atoms which are reactive toward isocyanate groups. However, preference is given to using this compound b1) in admixture with other compounds having at least two hydrogen atoms which are reactive toward isocyanate groups.

For this purpose, the customary and known compounds having at least two hydrogen atoms which are reactive toward isocyanate groups can preferably be used. Preference is given to using polyether alcohols and/or polyester alcohols in combination with the graft polyols b1).

The polyester alcohols used together with the graft polyols b1) are usually prepared by condensation of polyfunctional alcohols, preferably diols, having from 2 to 12 carbon atoms, preferably from 2 to 6 carbon atoms, with polyfunctional carboxylic acids having from 2 to 12 carbon atoms, for example succinic acid, glutaric acid, adipic acid, suberic acid, azelaic acid, sebacic acid, decanedicarboxylic acid, maleic acid, fumaric acid and preferably phthalic acid, isophthalic acid, terephthalic acid and the isomeric naphthalenedicarboxylic acids.

The polyether alcohols used together with the graft polyols b1) usually have a functionality in the range from 2 to 8, in particular from 3 to 8.

In particular, polyether alcohols prepared by known methods, for example by anionic polymerization of alkylene oxides in the presence of catalysts, preferably alkali metal hydroxides, are used.

As alkylene oxides, use is usually made of ethylene oxide and/or propylene oxide, preferably pure 1,2-propylene oxide.

As starter molecules, use is made of, in particular, compounds having at least 3, preferably from 4 to 8, hydroxyl groups or at least two primary amino groups in the molecule.

As starter molecules having at least 3, preferably from 4 to 8, hydroxyl groups in the molecule, preference is given to using trimethylopropane, glycerol, pentaerythritol, sugar compounds such as glucose, sorbitol, mannitol and sucrose, polyhydric phenols, resols such as oligomeric condensation products of phenol and formaldehyde and Mannich condensates of phenols, formaldehyde and dialkanolamines and also melamine.

As starter molecules having at least two primary amino groups in the molecule, preference is given to using aromatic diamines and/or polyamines, for example phenylenediamines, 2,3-, 2,4-, 3,4- and 2,6-toluenediamin (TDA), in particular the 2,3- and 3,4-isomers, and 4,4'-, 2,4'- and 2,2'-diaminodiphenylmethane, and also aliphatic diamines and polyamines such as ethylenediamine.

The polyether alcohols have a functionality of preferably from 3 to 8 and hydroxyl numbers of preferably from 100 mg KOH/g to 1200 mg KOH/g and in particular from 240 mg KOH/g to 570 mg KOH/g.

In a preferred embodiment of the process of the invention, a mixture of the graft polyol b1), a sucrose-initiated polyether alcohol b2) is used as compounds having at least two hydrogen atoms which are reactive toward isocyanate groups. A polyether alcohol b3) initiated using a trifunctional alcohol or an aromatic amine is particularly preferably additionally used.

The polyether alcohol b2) preferably has a hydroxyl number in the range from 375 to 525 mg KOH/g and a functionality of from 5 to 7.5. The sucrose is usually reacted in admixture with water and/or other bifunctional and trifunctional alcohols which are liquid at room temperature, e.g. ethylene glycol, propylene glycol and/or glycerol, with the alkylene oxides, preferably propylene oxide and/or ethylene oxide. The reaction can be catalyzed by means of alkali metal or alkaline earth metal hydroxides or amines.

The polyether alcohol b3) preferably has a hydroxyl number in the range from 100 to 250 mg KOH/g and a functionality of from 3 to 4. As trifunctional alcohols, preference is given to using glycerol or trimethylolpropane. As aromatic amine, preference is given to using TDA, with the 2,3- and 3,4-isomers being particularly preferably used.

In this embodiment of the invention, the component b) comprises from 10 to 25% by weight of the component b1), from 25 to 65% by weight of a sucrose-initiated polyether alcohol b2) and 10-40% by weight of a polyether alcohol b3) initiated using an aromatic amine or a polyether alcohol b3) initiated using a trivalent alcohol.

As regards the other starting materials used for the process of the invention, the following details may be provided:

As organic polyisocyanates a), preference is given to aromatic polyfunctional isocyanates.

Specific examples are: tolylene 2,4- and 2,6-diisocyanate (TDI) and the corresponding isomer mixtures, diphenylmethane 4,4'-, 2,4'- and 2,2'-diisocyanate (MDI) and the corresponding isomer mixtures, mixtures of diphenylmethane 4,4'- and 2,4'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. The organic diisocyanates and polyisocyanates can be used individually or in the form of mixtures.

Modified polyfunctional isocyanates, i.e. products which are obtained by chemical reaction of organic diisocyanates and/or polyisocyanates, are frequently also used. Examples which may be mentioned are diisocyanates and/or polyisocyanates comprising isocyanurate and/or urethane groups. The modified polyisocyanates can optionally be mixed with one another or with unmodified organic polyisocyanates such as diphenylmethane 2,4'-, 4,4'-diisocyanate, crude MDI, tolylene 2,4- and/or 2,6-diisocyanate.

In addition, it is also possible to use reaction products of polyfunctional isocyanates with polyhydric polyols and mixtures thereof with other diisocyanates and polyisocyanates.

Crude MDI having an NCO content of from 29 to 33% by weight and a viscosity at 25° C. in the range from 150 to 1000 mPa·s has been found to be particularly useful as organic polyisocyanate.

Further polyols which can be used in place of or in combination with the polyols b2) and b3) have been described above.

The compounds b) having at least two hydrogen atoms which are reactive toward isocyanate also include the chain extenders and crosslinkers which can optionally be concomitantly used. The polyurethane foams can be produced with or without the use of chain extenders and/or crosslinkers. The addition of bifunctional chain extenders, trifunctional and higher-functional crosslinkers or optionally mixtures thereof can be advantageous for modifying the mechanical properties. As chain extenders and/or crosslinkers, preference is given to using alkanolamines and in particular diols and/or triols having molecular weights of less than 400, preferably from 60 to 300.

Chain extenders, crosslinkers or mixtures thereof are advantageously used in an amount of from 1 to 20% by weight, preferably from 2 to 5% by weight, based on the compounds b) having at least two hydrogen atoms which are reactive toward isocyanate groups.

The reaction is usually carried out in the presence of catalysts, blowing agents and customary auxiliaries and/or additives.

Catalysts used are, in particular, compounds which strongly accelerate the reaction of the isocyanate groups with the groups which are reactive toward isocyanate groups. Such catalysts are strongly basic amines, e.g. secondary aliphatic amines, imidazoles, amidines and alkanolamines, or organic metal compounds, in particular organic tin compounds.

When isocyanurate groups are also to be incorporated in the rigid polyurethane foam, specific catalysts are necessary for this. Metal carboxylates, in particular potassium acetate and solutions thereof, are usually used as isocyanurate catalysts.

The catalysts can, depending on requirements, be used either alone or in any mixtures with one another.

As blowing agent, preference is given to using water which reacts with isocyanate groups to eliminate carbon dioxide. Physical blowing agents can also be used in combination with or in place of water. These are compounds which are inert toward the starting components and are usually liquid at room temperature and vaporize under the conditions of the urethane reaction. The boiling point of these compounds is preferably below 50° C. Physical blowing agents also include compounds which are gaseous at room temperature and are introduced under pressure into the starting components or are dissolved therein, for example carbon dioxide, low-boiling alkanes and fluoroalkanes.

The compounds are usually selected from the group consisting of alkanes and/or cycloalkanes having at least 4 carbon atoms, dialkyl ethers, esters, ketones, acetals, fluoroalkanes having from 1 to 8 carbon atoms and tetraalkylsilanes having from 1 to 3 carbon atoms in the alkyl chain, in particular tetramethylsilane.

Examples which may be mentioned are propane, n-butane, isobutane and cyclobutane, n-pentane, isopentane and cyclopentane, cyclohexane, dimethyl ether, methyl ethyl ether, methyl butyl ether, methyl formate, acetone and also fluoroalkanes which can be degraded in the troposphere and therefore do not damage the ozone layer, e.g. trifluoromethane, difluoromethane, 1,1,1,3,3-pentafluorobutane, 1,1,1,3,3-pentafluoropropane, 1,1,1,2-tetrafluoroethane, difluoroethane and 1,1,1,2,3,3,3-heptafluoropropane, and also perfluoroalkanes such as $C_3F_8$, $C_4F_{10}$, $C_5F_{12}$, $C_6F_{14}$ and $C_7F_{17}$. The abovementioned physical blowing agents can be used either alone or in any combinations with one another.

In a preferred embodiment of the process of the invention, a combination of water and an aliphatic hydrocarbon is used as blowing agent. Preferred hydrocarbons are n-pentane, isopentane and cyclopentane.

The process of the invention can, if required, be carried out in the presence of flame retardants and also customary auxiliaries and/or additives.

As flame retardants, it is possible to employ organic phosphoric and/or phosphonic esters. Preference is given to using compounds which are not reactive toward isocyanate groups. Chlorine-comprising phosphoric esters are also among the preferred compounds.

Typical representatives of this group of flame retardants are triethyl phosphate, diphenyl cresyl phosphate, tris(chloropropyl)phosphate and diethyl ethanephosphonate.

In addition, it is also possible to use bromine-comprising flame retardants. As bromine-comprising flame retardants, preference is given to using compounds which have groups which are reactive toward the isocyanate group. Such compounds are esters of tetrabromophthalic acid with aliphatic diols and alkoxylation products of dibromobutenediol. Compounds derived from the group of brominated neopentyl compounds comprising OH groups can also be employed.

As auxiliaries and/or additives, use is made of the materials known per se for this purpose, for example surface-active substances, foam stabilizers, cell regulators, fillers, pigments, dyes, flame retardants, hydrolysis inhibiters, antistatics, fungistatic and bacteriostatic agents.

Further details regarding the starting materials, blowing agents, catalysts and auxiliaries and/or additives used for carrying out the process of the invention may be found, for example, in the Kunststoffhandbuch, Volume 7, "Polyurethane" Carl-Hanser-Verlag. Munich, 1st Edition, 1966, 2nd Edition, 1983 and 3rd Edition, 1993.

To produce the rigid polyurethane foams, the polyisocyanates a) and the compounds b) having at least two hydrogen atoms which are reactive with isocyanate groups are reacted in such amounts that the isocyanate index is in the range from 100 and 220, preferably from 115 to 195.

The rigid polyurethane foams can be produced batchwise or continuously by means of known mixing apparatuses.

The production of polyisocyanurate foams can also be carried out with a higher index, preferably up to 350.

The rigid PUR foams of the invention are usually produced by the two-component process. In this process, the compounds b) having at least two hydrogen atoms which are reactive toward isocyanate groups are mixed with the flame retardants, the catalysts c), the blowing agents d) and the further auxiliaries and/or additives to form a polyol component and this is reacted with the polyisocyanates or mixtures of the polyisocyanates and optionally blowing agents, also referred to as isocyanate component.

The starting components are usually mixed at a temperature of from 15 to 35° C., preferably from 20 to 30° C. The reaction mixture can be introduced by means of high- or low-pressure metering machines into closed support tools. Sandwich elements, for example, are manufactured batchwise by this technology.

The reaction mixture can also be poured or sprayed free onto surfaces or into hollow spaces. Roofs or complicated containers can be produced in situ by this process. The reaction mixture can also be introduced simultaneously at one place or at a plurality of places into a closed mold having even a complex geometry. The position of injection of the reaction mixture can be located at various places on the mold. The mold can be aligned differently in respect of the directions in space at the point in time of injection of the reaction mixture. Such processes are typical for, for example, the production of refrigeration appliances. The reaction mixture can likewise be poured into an open mold which is closed after the completion of the filling operation. This procedure is, for example, typical of the production of doors for refrigeration appliances.

The continuous mixing of the isocyanate component with the polyol component for producing sandwich or insulation elements on double belt plants is also a preferred embodiment of the process of the invention. In this technology, it is usual to meter the catalysts and the blowing agents into the polyol component via further metering pumps. Here, the components used can be divided into up to 8 individual components. The foaming formulations can, on the basis of the two-component process, be converted in a simple manner to the processing of multicomponent systems.

The rigid polyurethane foams produced by the process of the invention can be produced with a very short demolding time on the basis of a phase-stable polyol component, which makes significantly shortened cycle times possible. Despite the presence of the graft polyol, large amounts of physical blowing agents are soluble in the polyol component, so that foam densities in the component of less than 30 g/l can be achieved. The foam properties in respect of compressive strength, thermal conductivity and quality of the foam surface/formation of sink holes are excellent.

Preparation of the Graft Polyols

The graft polyols used in the examples below were prepared in continuous processes and discontinuous processes. The synthesis of graft polyols by both processes is known and is described in a series of examples. Thus, for example, the synthesis of graft polyols by the semibatch processes is described in EP 439 755. One special form of the semibatch process is the semibatch seed process, in which additionally a graft polyol is used as seed in the initial reaction charge, as described for example in EP 510 533. The synthesis of graft polyols having a bimodal particle size distribution is described in WO 03/078496. The synthesis of graft polyols by a continuous process is likewise known and is described in WO 00/59971, for example.

The invention is illustrated by the following examples.

EXAMPLES a) Preparation of the Graft Polyols

To prepare graft polyols, the carrier polyol, the initiator, the moderator and 10% by weight of the amount of macromer are placed in a reactor provided with a stirrer and the mixture is heated to 100° C. The monomers and 90% of the macromer are subsequently metered in continuously.

After a reaction time of 165 minutes at 115° C., the unreacted monomers are distilled off at 10 mbar and 125° C. over a period of 2 hours.

Moderator: 1% of dodecanethiol (based on the amount of monomers)

Initiator: 0.45% of Wako V601

The other starting materials and the properties of the graft polyols are shown in Table 1.

TABLE 1

| | Graft polyols | | | | |
|---|---|---|---|---|---|
| Graft polyol | Graft polyol C1 | Graft polyol C2 | Graft polyol 1 | Graft polyol 2 | Graft Polyol 3 |
| Carrier polyol | Polyol 1 | Polyol 2 | Polyol 3 | Polyol 3 | Polyol 3 |
| Polyethersiloxane | — | 15% | 15% | 12% | 12% |
| Solids content | 45% | 35% | 35% | 40% | 40% |
| ACN:STY | 3:1 | 3:1 | 3:1 | 3:1 | 1:1 |
| Macromer | | 8 | 20 | 27 | 42 |
| Particle size | 1 μm | 60 μm | 5 μm | 0.8 μm | 1.5 μm |
| Stability | Separation of the particles in formulation | Poor stabilization of the graft polyol. Separation of the particles in formulation | Poor stabilization of the graft polyol. Phase-stable in formulation | Phase-stable in formulation | Phase-stable in formulation |

TABLE 2

| | | | Macromers: | | | | | |
|---|---|---|---|---|---|---|---|---|
| | a | b | c | d | e | f | g | h |
| 8 | 4400 | 7 | 980 | 8.6 | 81:19 | 0.9 | 13000 | 0.34 |
| 20 | 5050 | 8.3 | 1700 | 8.4 | 60:40 | 0.9 | 19000 | 0.27 |
| 27 | 5050 | 8.3 | 1250 | 8.4 | 60:40 | 0.9 | 16000 | 0.32 |
| 42 | 5050 | 10.6 | 980 | 6.5 | 60:40 | 0.9 | 11000 | 0.46 |

The following definitions relate to the general formula (I)
a - molecular weight of polysiloxane chain (polymer backbone)
b - average number of Si atoms between the branches
c - molecular weight of a side chain
d - average number of branches in the molecule
e - ratio of ethylene oxide to propylene oxide in the side chain
f - average number of OH groups which are converted into a terminal C=C bond
g - total molecular weight of the macromer (polyethersilioxane)
h - amphiphilicity, viz. the ratio of the hydrophobic constituents of the molecule to the total molecular weight Production of Rigid Foams (Machine Foaming)

The various polyols, stabilizers, catalysts are mixed with water and the blowing agent in the ratios indicated in table 3. 100 parts by weight of the polyol component were mixed with the amount shown in each case in table 1 of a mixture of diphenylmethane diisocyanate and polyphenylenepolymethylene polyisocyanate having an NCO content of 31.5% by weight and a viscosity of 200 mPas (25° C.) in a Puromat® HD 30 high-pressure foaming machine (Elastogran GmbH). The reaction mixture was injected into a mold having the dimensions 200 cm×20 cm×5 cm or 40 cm×70 cm×9 cm and allowed to foam there. The properties and characteristic data of the foams obtained are shown in table 3.

The thermal conductivity is determined in accordance with DIN 52616. To produce test specimens, the polyurethane reaction mixture is poured into a mold having the dimensions $200 \times 20 \times 5$ cm$^3$ (10% overfilling) and a test specimen having the dimensions $20 \times 20 \times 2$ cm$^3$ is cut from the middle after a few hours.

The compressive strength is determined in accordance with DIN 53421/DIN EN ISO 604.

Flowability is a dimensionless parameter and the ratio of core foam density to free-foamed foam density.

TABLE 3

| | Foams | | | | | |
|---|---|---|---|---|---|---|
| | Comparison 1 | Comparison 2 | Comparison 3 | Ex. 1 | Ex. 2 | Ex. 3 |
| Polyol 2 | 47.3 | 47.3 | 47.3 | 47.3 | 47.3 | 47.3 |
| Polyol 1 | 30 | 30 | 30 | 30 | 30 | 30 |
| Polyol 3 | 16 | 12 | 12 | 12 | 12 | 12 |
| Graft polyol C1 | | 4 | | | | |
| Graft polyol C2 | | | 4 | | | |
| Graft polyol 1 | | | | 4 | | |
| Graft polyol 2 | | | | | 4 | 15 |
| Water | 2.7 | 2.7 | 2.7 | 2.7 | 2.7 | 2.7 |
| Stabilizer | 2 | 2 | 2 | 2 | 2 | 2 |
| Amine catalyst | 2.1 | 2.1 | 2.1 | 2.1 | 2.1 | 2.1 |
| Cyclopentane 70 | 13 | 13 | 13 | 13 | 13 | 13 |
| Particle content | 0 | 4 | 4 | 4 | 4 | 15 |
| STY:ACN | 0 | 1:1 | 1:1 | 1:2 | 1:1 | 1:2 |
| Compressive strength, overpack 10% [N/mm2] | 13.1 | 14.1 | 14.9 | 15.2 | 14.8 | 16.0 |
| Thermal conductivity [mW/mK] | 19.4 | 19.2 | 19.2 | 19.3 | 19.2 | 19.1 |
| Demoldability [mm] [3 min. 20% overpack] | 96.4 | 96.9 | 95.0 | 95.1 | 94.9 | 94.3 |
| Flowability | 1.34 | 1.35 | 1.33 | 1.34 | 1.35 | 1.34 |
| Molding density [g/l] | 29.2 | 27.4 | 28.1 | 27.5 | 27.9 | 28.1 |
| Free-foamed density [g/l] | 21.4 | 20.3 | 21.1 | 20.5 | 21.0 | 21.4 |

Polyol 1: Polyether alcohol derived from vicinal TDA and ethylene oxide and propylene oxide having a hydroxyl number of 390 mg KOH/g and a viscosity at 25° C. of 17000 mPas;

Polyol 2: Polyether alcohol derived from sucrose, glycerol and propylene oxide having a hydroxyl number of 440 mg KOH/g and a viscosity of 2000 mPas at 25° C.;

Polyol 3: Polyether alcohol derived from vicinal TDA and ethylene oxide and propylene oxide having a hydroxyl number of 160 mg KOH/g and a viscosity of 800 mPas at 25° C.;

Graft polyol C1: Graft polyol based on polyol 3, 10% macromer (a reaction product of sorbitol with ethylene oxide/propylene oxide and TMI, molecular weight 18000 g/mol), styrene:acrylonitrile 1:3, solids content 45%, particle size 1 micrometer;

Graft polyol C2: Graft polyol based on polyol 3, 15% macromer 8, styrene:acrylonitrile 1:3, solids content 35%, particle size 60 micrometers;

Graft polyol 1: Graft polyol based on polyol 3, 15% macromer 20, styrene:acrylonitrile 1:3, solids content 35%, particle size 5 micrometers;

Graft polyol 2: Graft polyol based on polyol 3, 12% macromer 27, styrene:acrylonitrile 1:3, solids content 40%, particle size 0.8 micrometer;

Graft polyol 3: Graft polyol based on polyol 3, 12% macromer 42, styrene:acrylonitrile 1:1, solids content 40%, particle size 1.5 micrometers;

Stabilizer is Tegostab B8462 (silicone stabilizer)

The invention claimed is:

1. A particle-comprising polyether alcohol produced by a process comprising performing an in-situ polymerization of at least one olefinically unsaturated monomeric compound in a polyether alcohol as a carrier polyol, wherein:

the in-situ polymerization is carried out in the presence of at least one macromer which is distinct from the carrier polyol, said macromer comprising a polysiloxane chain to which at least one polyether chain comprising at least one reactive hydrogen atom and a polyether chain comprising at least one olefinic double bond are bonded;

the at least one macromer is represented by formula (I):

$$\begin{array}{c} Me \\ | \\ Me-Si-Me \\ | \\ A_y \\ | \\ B_x \\ | \\ C_z \\ | \\ O \\ | \\ Me-Si-Me, \\ | \\ Me \end{array} \quad (I)$$

where $$A = \begin{array}{c} | \\ O \\ | \\ Me-Si-CH_2CH_2CH_2-O-\left[\phantom{x}\right]_n-O-\left[\phantom{x}\right]_m-OH \\ | \end{array}$$

$$B = \begin{array}{c} | \\ O \\ | \\ Me-Si-Me \\ | \end{array}$$

$$C = \begin{array}{c} | \\ O \\ | \\ Me-Si-CH_2CH_2CH_2-O-\left[\phantom{x}\right]_n-O-\left[\phantom{x}\right]_m-M-C(R)=CH_2 \\ | \end{array};$$

x, y and z are all greater than zero;

A, B and C are arranged randomly and x, y and z are selected such that a ratio of a molecular weight of the polysiloxane chain to a total molecular weight of the macromer is from 0.25:1 to 0.65:1;

Me is a methyl group;

R is an alkyl group having from 1 to 10 carbon atoms;

M is an alkylene or arylene group or araliphatic group having from 2 to 10 carbon atoms, which is optionally bound to a polyether chain via an ether, ester, urethane, carbonate or acetal bond;

m, n are integers which are selected such that molecular weight Mn of each unit A ranges from 500 to 2000 and molecular weight Mn of each unit C ranges from 500 to 2000 and a ratio n:m for both of A and C is in a range of from 20:80 to 80:20; and the polysiloxane chain is a polymer backbone of formula:

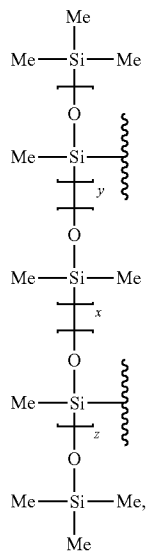

having a molecular weight Mn in a range of from 3000 to 7000, in which x, y and z are defined as above.

2. The particle-comprising polyether alcohol according to claim 1, wherein the at least one macromer is represented by formula (II):

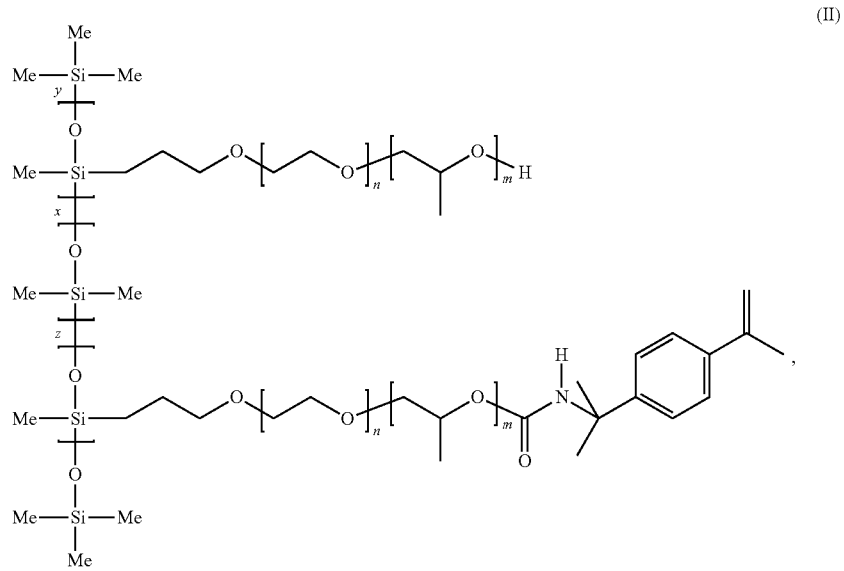

in which n, m, x, y and z are as defined in claim 1.

3. The particle-comprising polyether alcohol according to claim 2, wherein the at least one olefinically unsaturated monomer compound comprises at least one of styrene and acrylonitrile.

4. The particle-comprising polyether alcohol according to claim 1, wherein the at least one macromer has from 0.7 to 1 group C in a molecule.

5. The particle-comprising polyether alcohol according to claim 1, wherein the at least one macromer has a molecular weight Mn of from 8000 to 30 000.

6. The particle-comprising polyether alcohol according to claim 1, wherein the at least one macromer comprises on average from 7 to 20 units of B between each 2 units of A and/or C.

7. The particle-comprising polyether alcohol according to claim 1, which comprises particles of from 35% by weight to 65% by weight, based on a weight of said particle-comprising polyether alcohol.

8. The particle-comprising polyether alcohol according to claim 1, which has a hydroxyl number of from 40 to 260 mg KOH/g.

9. The particle-comprising polyether alcohol according to claim 1, wherein the at least one olefinically unsaturated monomer compound comprises at least one of styrene and acrylonitrile.

10. A process for producing a particle-comprising polyether alcohol, the process comprising performing an in-situ polymerization of at least one olefinically unsaturated monomeric compound in a polyether alcohol as a carrier polyol, wherein:
the in-situ polymerization is carried out in the presence of at least one macromer which is distinct from the carrier polyol, said macromer comprising a polysiloxane chain to which at least one polyether chain comprising at least one reactive hydrogen atom and a polyether chain comprising at least one olefinic double bond are bonded;

the at least one macromer is represented by formula (I):

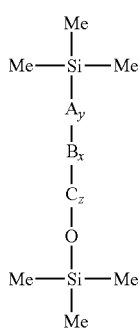

(I)

where

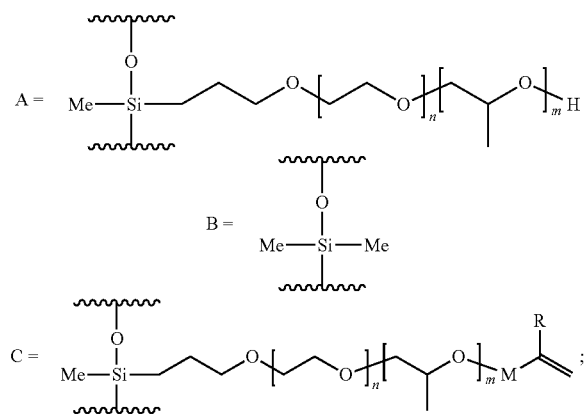

x, y and z are all greater than zero;
A, B and C are arranged randomly and x, y and z are selected such that a ratio of a molecular weight of the polysiloxane chain to a total molecular weight of the macromer is from 0.25:1 to 0.65:1;
Me is a methyl group;
R is an alkyl group having from 1 to 10 carbon atoms;
M is an alkylene or arylene group or araliphatic group having from 2 to 10 carbon atoms, which is optionally bound to a polyether chain via an ether, ester, urethane, carbonate or acetal bond;

m, n are integers which are selected such that molecular weight Mn of each unit A ranges from 500 to 2000 and molecular weight Mn of each unit C ranges from 500 to 2000 and a ratio n:m for both of A and C is in a range of from 20:80 to 80:20; and
the polysiloxane chain is a polymer backbone of formula:

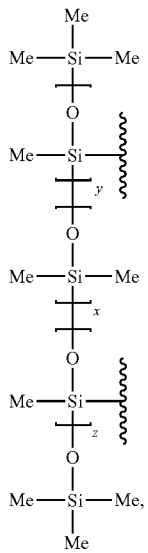

having a molecular weight Mn in a range of from 3000 to 7000, in which x, y and z are defined above.

11. A process for producing a polyurethane, comprising:
reacting at least one polyisocyanate a) with at least one compound b) having at least two hydrogen atoms which are reactive toward an isocyanate group,
wherein the at least one compound b) comprises at least one of the particle-comprising polyether alcohol according to claim 1.

12. The process according to claim 11, wherein the particle-comprising polyether alcohol is present in an amount of from 2 to 30% by weight, based on a weight of the at least one compound b).

13. A polyurethane produced by the process according to claim 11.

14. A process for producing a polyurethane, comprising:
reacting at least one polyisocyanate and the particle-comprising polyether alcohol of claim 1.

* * * * *